(12) United States Patent
Sawan et al.

(10) Patent No.: US 11,763,008 B2
(45) Date of Patent: Sep. 19, 2023

(54) ENCRYPTING DATA USING AN ENCRYPTION PATH AND A BYPASS PATH

(71) Applicant: International Business Machines Corporation, Armonk, NY (US)

(72) Inventors: Tony Sawan, Round Rock, TX (US); Adam Samuel Hale, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 16/742,972

(22) Filed: Jan. 15, 2020

(65) Prior Publication Data

US 2021/0216645 A1 Jul. 15, 2021

(51) Int. Cl.
*G06F 21/60* (2013.01)
*H04L 9/08* (2006.01)
*G06F 9/455* (2018.01)

(52) U.S. Cl.
CPC .......... *G06F 21/602* (2013.01); *H04L 9/0866* (2013.01); *G06F 2009/45583* (2013.01)

(58) Field of Classification Search
CPC ............... G06F 21/602; G06F 9/45558; G06F 2009/45583; G06F 2009/45587; H04L 9/0866; H04L 9/0894
See application file for complete search history.

(56) References Cited

U.S. PATENT DOCUMENTS

| 8,909,942 | B1 | 12/2014 | Obukhov et al. |
| 8,938,627 | B2 | 1/2015 | Oggioni et al. |
| 9,448,846 | B2 | 9/2016 | Bass et al. |
| 10,038,550 | B2 | 7/2018 | Gopal et al. |
| 10,185,499 | B1 | 1/2019 | Wang et al. |
| 2002/0073326 | A1 | 6/2002 | Fontijn |
| 2006/0015748 | A1 | 1/2006 | Goto et al. |

(Continued)

FOREIGN PATENT DOCUMENTS

| CN | 102855161 A | 1/2013 |
| CN | 202870835 U | 4/2013 |

(Continued)

OTHER PUBLICATIONS

PCT Notification of Transmittal of the International Search Report and the Written Opinion of the International Searching Authority, or the Declaration, for Application No. PCT/IB2021/05005 dated Apr. 9, 2021.

(Continued)

*Primary Examiner* — Bruce S Ashley
(74) *Attorney, Agent, or Firm* — Patterson + Sheridan, LLP (57) ABSTRACT

Embodiments herein describe a memory controller that has an encryption path and a bypass path. Using an indicator (e.g., a dedicated address range), an outside entity can inform the memory controller whether to use the encryption path or the bypass path. For example, using the encryption path when performing a write request means the memory controller encrypts the data before it was stored, while using the bypass path means the data is written into memory without be encrypted. Similarly, using the encryption path when performing a read request means the controller (Continued)

decrypts the data before it is delivered to the requesting entity, while using the bypass path means the data is delivered without being decrypted.

9 Claims, 4 Drawing Sheets

(56) References Cited

U.S. PATENT DOCUMENTS

| | | | |
|---|---|---|---|
| 2010/0325431 A1 | 12/2010 | Mordetsky et al. | |
| 2013/0111219 A1 | 5/2013 | Avanch et al. | |
| 2014/0101459 A1* | 4/2014 | Debout | G06F 3/0619 |
| | | | 713/190 |
| 2015/0046702 A1 | 2/2015 | Paaske et al. | |
| 2015/0095661 A1 | 4/2015 | Sell et al. | |
| 2015/0248357 A1 | 9/2015 | Kaplan et al. | |
| 2016/0154744 A1 | 6/2016 | Zheng et al. | |
| 2016/0308669 A1 | 10/2016 | Ho et al. | |
| 2017/0277898 A1* | 9/2017 | Powell | G06F 21/53 |
| 2017/0286213 A1 | 10/2017 | Li | |
| 2019/0044922 A1 | 2/2019 | Schultz et al. | |
| 2020/0313911 A1* | 10/2020 | Mondello | H04L 9/0861 |
| 2020/0402426 A1* | 12/2020 | Li | G06F 12/1408 |
| 2021/0200880 A1* | 7/2021 | Khosravi | G06F 21/79 |
| 2021/0216476 A1 | 7/2021 | Sawan et al. | |

FOREIGN PATENT DOCUMENTS

| | | |
|---|---|---|
| CN | 109670344 A | 4/2019 |
| CN | 110213052 A | 9/2019 |
| CN | 111903103 A | 11/2020 |
| CN | 112836247 A | 5/2021 |
| WO | WO-2020000285 A1 * | 1/2020 ......... G06F 12/1408 |

OTHER PUBLICATIONS

Hafsa et al., "A Hardware-Software Co-designed AES-ECC Cryptosystem," 2017 International Conference on Advanced Systems and Electric Technologies (IC_ASET) (Background).

Gschwind, "Workload acceleration with the IBM Power vector-scalar architecture" IBM Journal of Research and Development 60.2-3 (2016): 14-1. (Background).

Mulani et al., "Area optimizTion of cryptographic algorithm on less dense Reconfigurable platform," 2014 International Conference on Smart Structures & Systems (ICSSS-2014), Chennai-India. 4 pages.

"List of IBM Patents or Patent Applications Treated as Related," for U.S. Appl. No. 16/742,972, filed Jan. 15, 2020.

* cited by examiner

ENCRYPTING DATA USING AN ENCRYPTION PATH AND A BYPASS PATH

BACKGROUND

Encryption is a common method for data protection and software security, but software based encryption is slow and requires the encryption key to be known by the software. Making the key accessible to the software means the key is more easily obtainable by a nefarious actor. While hardware encryption can be performed instead (where the encryption key is not made available to software), hardware accelerator based encryption requires costly system calls to execute.

Modern processors have built-in encryption engines for encrypting data stored in short term memory (e.g., random access memory (RAM)). These processors have one user configurable setting: either all the data stored in memory is encrypted, or none of the data stored in memory is encrypted. If the processor is set to encrypt all the data, whenever the data is moved from the short term memory to long term storage (e.g., a hard disk drive or solid state drive), the processor first decrypts the data before storing the data. Thus, the data is only encrypted when residing in short term memory. In order to encrypt the data in long-term storage, a software application would need to generate another request. Thus, the advantages of performing hardware encryption are limited.

SUMMARY

According to one embodiment of the present invention, a system includes a processor core and a memory controller including an encryption path and a bypass path, where the encryption path comprises an encryption engine for encrypting and decrypting data. The memory controller is configured to receive a first write request to write first data into a memory, the first write request comprising a first indicator indicating that the encryption path should be used, encrypt the first data using the encryption engine before storing the first data in the memory, receive a second write request to write second data into the memory, the second write request comprising a second indicator indicating that the bypass path should be used, and store the second data in the memory using the bypass path, wherein the bypass path bypasses the encryption engine.

Another embodiment described herein is a method that includes receiving a first write request at a memory controller to write first data into a memory, the first write request comprising a first indicator indicating that an encryption path in the memory controller should be used, encrypting the first data using an encryption engine in the encryption path before storing the first data in the memory, receiving a second write request at the memory controller to write second data into the memory, the second write request comprising a second indicator indicating that a bypass path in the memory controller should be used, and storing the second data in the memory using the bypass path, wherein the bypass path bypasses the encryption engine.

Another embodiment described herein is a memory controller in an integrated circuit. The memory controller includes an encryption path comprising an encryption engine, and a bypass path configured to bypass the encryption engine. The memory controller is configured to receive a first write request to write first data into a memory, the first write request comprising a first indicator indicating that the encryption path should be used, encrypt the first data using the encryption engine before storing the first data in the memory, receive a second write request to write second data into the memory, the second write request comprising a second indicator indicating that the bypass path should be used, and store the second data in the memory using the bypass path.

DETAILED DESCRIPTION

Embodiments herein describe performing hardware encryption in a processor using an encryption key that is based on an address at which the data is stored in memory. For example, the encryption key can include two portions: one portion which is a unique ID provided by the manufacture that is not accessible to any entities external to the processor and a second portion derived from the physical address in which the data is stored. The processor can generate the encryption key using these two portions. Thus, data stored at a different location has a different encryption key. Rather than using a static key (e.g., if the entire key was assigned by the manufacture), having a dynamic portion of the encryption key that is based on the address of the data makes the encryption key nearly impossible to crack using a brute force method.

Further, rather than a processor being set to either always encrypt/decrypt data stored in memory or to never encrypt/decrypt data, in one embodiment a memory controller in the processor has an encryption path and a bypass path. Using an indicator (e.g., a dedicated address range), an outside entity (e.g., a hypervisor or software application) can inform the memory controller whether to use the encryption path or the bypass path. For example, using the encryption path when performing a write request means the memory controller encrypts the data before it was stored, while using the bypass path means the data is written into memory without being encrypted. Similarly, using the encryption path when performing a read request means the controller decrypts the data before it is delivered to the requesting entity, while using the bypass path mean the data is delivered without being decrypted. Thus, a software application can instruct the processor to use the encryption path when performing a write operation so that the data is first encrypted before being stored and later instruct the processor to use the bypass path when performing a read operation so that the now encrypted data is retrieved without being decrypted (and can be stored in long term storage in an encrypted state).

Later, the software application may want to decrypt the encrypted data. The software application can use another write request to instruct the processor to store the encrypted data in RAM using the bypass path (so that the already encrypted data is not re-encrypted). A read request can then be used to instruct the process to retrieve the encrypted data from RAM using the encryption path so that the data is decrypted before being returned to the software application. In this manner, only hardware encryption is used and the software application can encrypt and decrypt data without knowing the encryption key.

Figure 1:
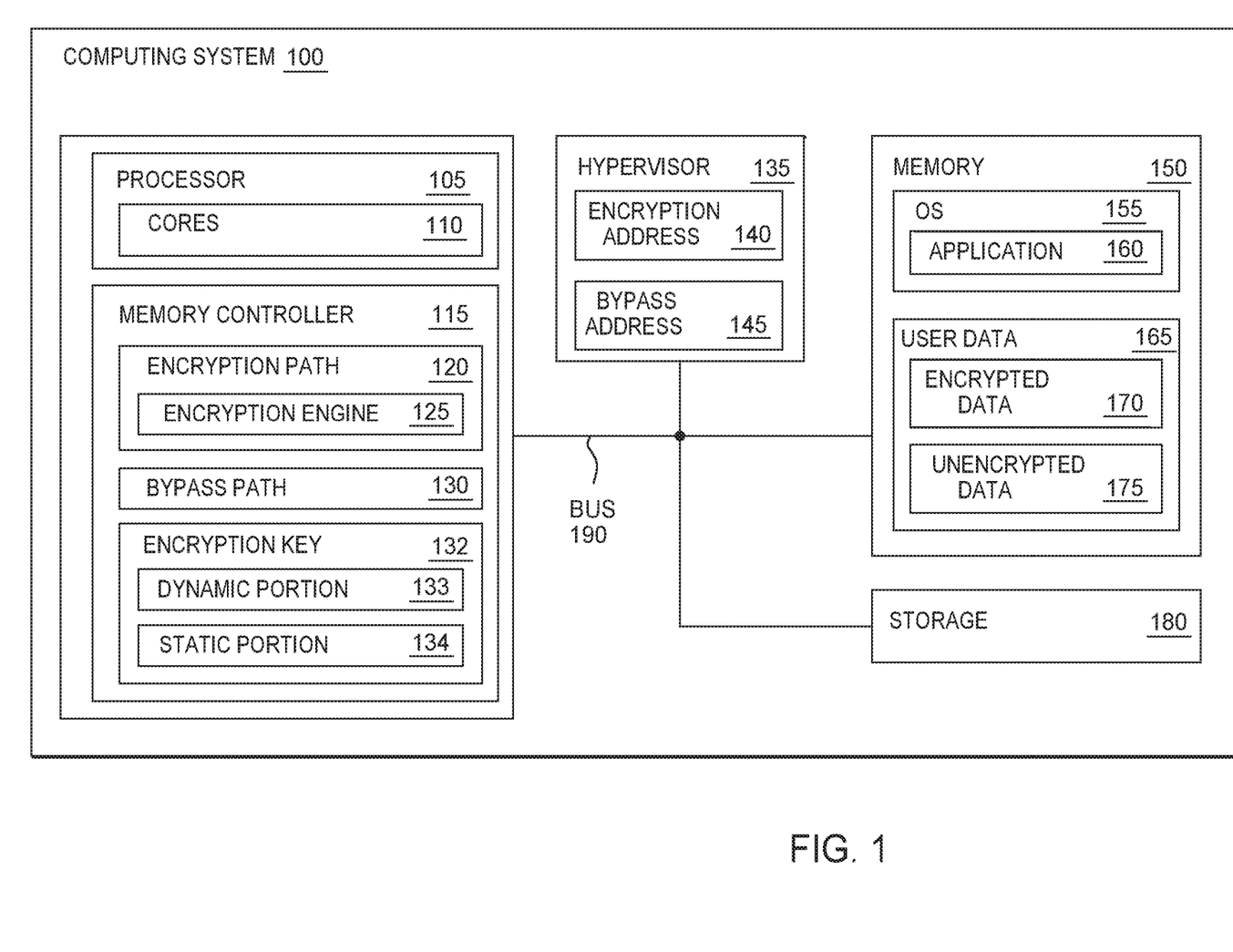
FIG. 1 is a block diagram of a computing system for performing selective hardware encryption, according to one embodiment described herein.

FIG. 1 is a block diagram of a computing system 100 for performing selective hardware encryption, according to one embodiment described herein. The computing system 100 includes a processor 105, a hypervisor 135, memory 150, and storage 180 that are communicatively coupled using a bus 190. The processor 105 includes one or more cores 110 and a memory controller 115 that serves as an interface between the cores 110 and the memory 150 (e.g., a short term or volatile memory such as RAM). Although not shown, the cores 110 can include one or more caches.

The memory controller 115 includes an encryption path 120 for encrypting and decrypting data being stored in, or retrieved from, the memory 150 and a bypass path 130 where data is stored in, or retrieved from, the memory 150 without being encrypted or decrypted. For example, as described in more detail below, the processor 105 can receive a write request from the hypervisor 135 that contains an encryption address 140 which serves as an indicator to the memory controller 115 that the encryption path 120 should be used (i.e., the data should be encrypted) when writing the data to the memory 150. Conversely, if the write request instead contains a bypass address 145, this indicates to the memory controller 115 that the bypass path 130 should be used—i.e., the data should be stored in the memory 150 without being encrypted. The hypervisor 135 can also use the encryption address 140 and the bypass address 145 when transmitting read request to instruct the memory controller 115 to decrypt the data using the encryption path 120 or instead use the bypass path 130. Although in FIG. 1 the memory controller 115 is shown as being in the same integrated circuit forming the processor 105, the memory controller 115 may be part of a separate integrated circuit.

The encryption path 120 includes an encryption engine 125 that performs encryption and decryption. That is, the encryption engine 125 can encrypt the data when performing a write request using the encryption path 120 and also decrypt the data when performing a read request using the encryption path 120. However, in another embodiment, the memory controller may have an encryption path dedicated to encrypting data being stored in the memory 150 and a decryption path dedicated to decrypting data being retrieved from the memory 150 (as well as the bypass path 130). For simplicity, FIG. 1 illustrates a single encryption path 120 and encryption engine 125 that can perform both encryption and decryption.

The encryption engine 125 uses an encryption key 132 to encrypt and decrypt data. In one embodiment, the encryption key 132 has at least two portions: a static portion 134 that is formed using a unique sub-key or ID that is set by the manufacturer of the processor 105 and a dynamic portion 133 formed using a physical address at which the data is stored in the memory 150. The sub-key provided by the manufacturer may be inaccessible to outside entities. That is, the hypervisor, 135, an operating system (OS) 155, and the application 160 may be unable to retrieve the sub-key from the processor 105.

When receiving a read or write request, the memory controller 115 uses the dynamic portion 133 (e.g., the physical address of the data) and the static portion 134 (e.g., the ID or sub-key) to generate the encryption key 132. For example, the memory controller 115 may combine a portion (or all) of the physical address with the sub-key to generate the encryption key 132. In this manner, the first portion of the encryption key 132 is static (i.e., the ID or sub-key burned into the processor 105) while the second portion is dynamic and changes according to physical address in the read or write request. Thus, if the encrypted data is acquired by a nefarious actor, the actor would have to know both the unique sub-key of the processor 105 as well as the physical address the data was stored in the memory 150 when it was encrypted. Further, every cache line of encrypted data in the memory 150 may be encrypted using a different encryption key 132. This makes using a brute force method to crack the various encryption keys 132 nearly impossible.

In one embodiment, the encryption key 132 is based on a range of addresses (e.g., a memory block) rather than a single address. In that example, encrypted data stored in the same memory block (or any other logical data partition in the memory 150) may be encrypted using the same encryption key 132 while encrypted data in a different memory block is encrypted using a different value of the encryption key 132.

The hypervisor 135 may be firmware, hardware, software, or a combination thereof. In one embodiment, the hypervisor 135 provides an interface between a virtual address space assigned to the OS 155 and the application 160 and the physical addresses used by the processor 105. For example, the application 160 may send read and write requests based on the virtual address space which the hypervisor 135 converts to physical addresses of the memory 150. These physical addresses may be different than the encryption address 140 and the bypass address 145 used to indicate to the memory controller 115 whether to use the encryption path 120 and the bypass path 130 when servicing the read or write request. As mentioned above, the memory controller 115 can use the physical address (or a portion thereof) to generate the encryption key 132.

The encryption address 140 and bypass address 145 can be any indicator for instructing the memory controller 115 whether the data needs to be encrypted/decrypted or not. For example, the encryption address 140 and bypass address 145 can be flags or single memory addresses, or a range of memory addresses. In one embodiment, the encryption address 140 may be part of a base address register (BAR) while the bypass address 145 is a different BAR. Depending on which BAR value is used in the read or write request, the memory controller 115 can determine whether to use the encryption path 120 or the bypass path 130.

The memory 150 can be any short term memory element (e.g., a volatile memory) such as DRAM, SRAM, and the like. However, the memory 150 does not need to be a short term memory element, although that is the typical arrangement in modern computing systems. For example, the memory 150 may contain non-volatile memory.

The memory 150 includes the OS 155 (which can be any OS suitable for performing the tasks described herein) and user data 165. The application 160 is hosted by the OS 155 and can be any software application. The application 160 generates tasks that are performed by the processor 105. These tasks may include read and write requests where the memory controller 115 stores the user data 165 in the memory 150. As mentioned above, based on the instructions from the application 160 and the hypervisor 135, the memory controller 115 can use the encryption path 120 to store encrypted data 170 in the memory 150 and use the bypass path 130 to store unencrypted data 175. The decision to encrypt/decrypt (or not encrypt/decrypt) the user data 165 can be made by the application 160 on a task-by-task basis (e.g., for every read and write request) rather than being a setting in the processor 105 where the processor 105 either always encrypts the user data 165 stored in memory, or never encrypts the data.

In one embodiment, the storage 180 is a long term storage device containing non-volatile memory elements (e.g., a hard disk drive or solid state drive). In one embodiment, the application 160 may want to store the encrypted data 170 in the storage 180. The application 160 can transmit a read request to the memory controller 115 indicating that the bypass path 130 should be used to retrieve the encrypted data 170 and forward it to the storage 180. The encrypted data 170 then bypasses the encryption engine 125 and is stored in its encrypted state. Thus, if a nefarious actor accesses the data (either by physically stealing the storage 180 or by electronic means), the data 170 is encrypted. This is also useful if the storage 180 is part of a remote data storage node such as a data center or a cloud storage service. If the security on the remote node fails, the data has been encrypted using an encryption key 132 that is based solely on the hardware in the computing system 100 (e.g., the sub-key assigned to the processor 105 and a physical address in the memory 150). Thus, the likelihood that the nefarious actor can decrypt the data without gaining physical control of the computing system 100 is extremely low.

Figure 2:
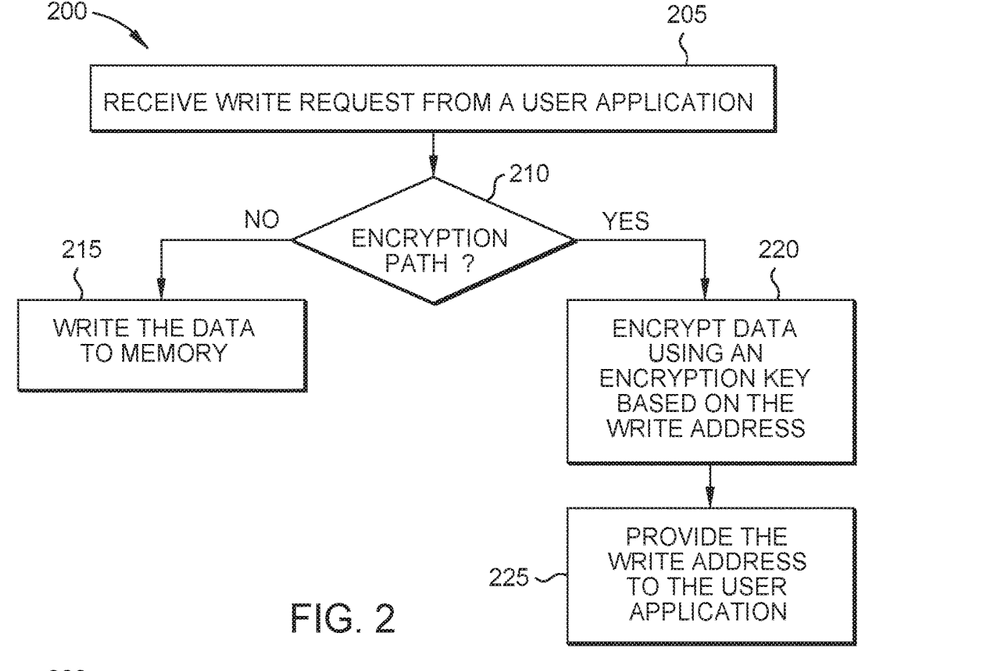
FIG. 2 is a flowchart for performing a write request using an encryption path or a bypass path, according to one embodiment described herein.

FIG. 2 is a flowchart of a method 200 for performing a write request using an encryption path or a bypass path, according to one embodiment described herein. At block 205, the processor receives a write request from a user application (or hypervisor). In one embodiment, the write request includes an indicator that tells the processor whether the data corresponding to the write request should be encrypted before being stored in the memory (e.g., using the encryption address 140 or bypass address 145 in FIG. 1). The write request can also include a physical address (or a range of physical addresses) where the data should be written into the memory.

At block 210, hardware logic in the memory controller determines whether to use the encryption path to store the data using the indicator contained in the write request. Put differently, the memory controller uses the indicator to determine whether to use the encryption path or the bypass path.

If the bypass path is selected, the method proceeds to block 215 where the memory controllers write the data to memory without first encrypting the data. That is, the memory controller uses the bypass path to bypass the encryption engine in the encryption path. However, if the memory controller selects the encryption path, at block 220, the encryption engine encrypts the data using an encryption key based on the write address—e.g., the physical address of the memory where the encrypted data is to be stored after being encrypted. The write address may be provided by the hypervisor or by logic within the processor.

In addition to being based on the write address, the encryption key can also be based on a unique ID or sub-key assigned to the processor by the manufacturer. The memory controller can use a predefined technique to combine the sub-key and the write address to form the encryption key. For example, the bits of the sub-key may be concatenated with some or all of the bits in the write address (e.g., its most- or least-significant bits) to form the encryption key. However, the embodiments herein are not limited to any particular technique for combining a static portion with a dynamic portion in order to generate an encryption key.

At block 225, the hypervisor (or hardware logic in the memory controller) provides the write address to the user application. Because in this example the data was encrypted using a key based on the write address, that same write address needs to be used so the data can be decrypted. The user application can record in a table or other data structure the memory address of the encrypted data when stored in the memory. That way, the data can then be removed from the memory (e.g., move to storage in the computing system or a remote compute node) or moved to a different location in the memory, and then later be decrypted using the same encryption key. The process for decrypting data that was previously encrypted using the method 200 is described in more detail in FIG. 4.

In any case, method 200 illustrates that a memory controller can use an indicator in a write request to determine, for each request, whether the corresponding data should be encrypted before being stored in memory. Further, the memory controller can use an encryption key that is based on the write address to encrypt the data, although this is not a requirement. That is, the method 200 can be used with any encryption key (whether completely static, completely dynamic, or a combination of static and dynamic portions). If the encryption key is completely static (e.g., the memory controller uses the same encryption key for all the data it encrypts), then block 225 can be omitted since there is no dynamic portion that should be tracked by the user application.

Figure 3:
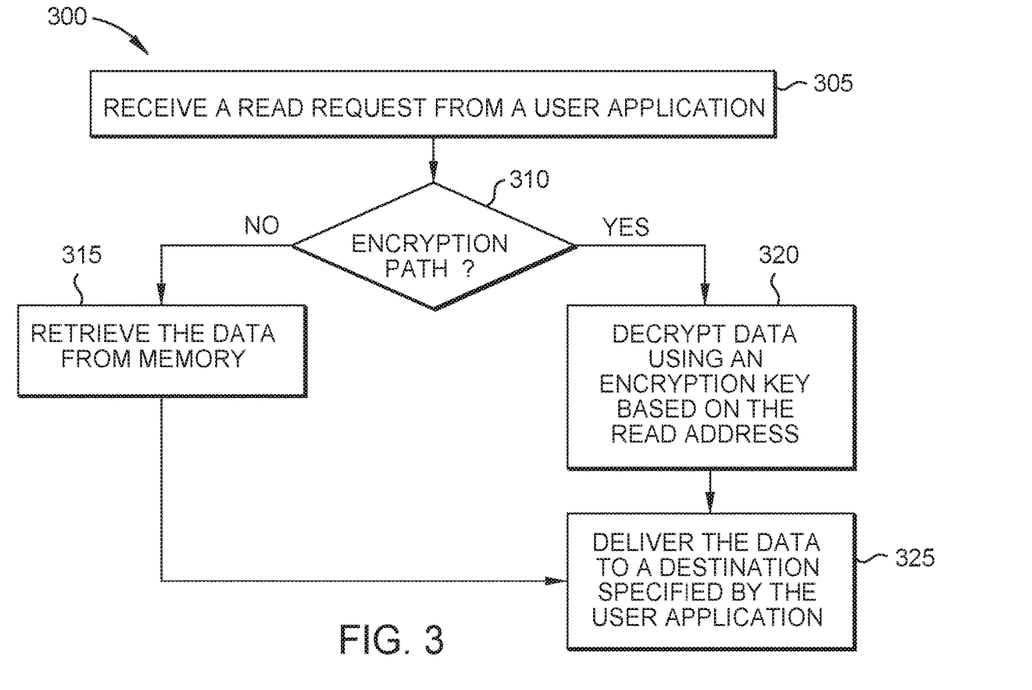
FIG. 3 is a flowchart for performing a read request using an encryption path or a bypass path, according to one embodiment described herein.

FIG. 3 is a flowchart of a method 300 for performing a read request using an encryption path or a bypass path, according to one embodiment described herein. That is, while the method 200 describes a computing system performing a write request using the memory controller, the method 300 describes the same computing system performing a read request.

At block 305, the processor receives a read request from a user application or hypervisor. Like in the method 200, the read request can include an indicator indicating whether the data being read from the memory (e.g., the RAM) should, or should not, be decrypted when being retrieved. For example, the application may wish to move the encrypted data to a long term storage device in the computing system or in a remote data storage node. For enhanced security, the application may want to store the data in an encrypted state. In that example, the indicator in read request would instruct the memory controller to use the bypass path when retrieving the data so the data remains encrypted.

In another example, the application may retrieve the data so that it can be sent to a second, different computing system for processing. In that case, because only the processor in the current computing system is able to decrypt the encrypted data in the memory, the application instructs the processor to decrypt the encrypted data so that the second computing system can process the data. Of course, the application may again encrypt the data before sending it to second computing system, but instead of using the hardware encryption key in the memory controller, the application may perform software encryption using a key that is shared with the second computing system. That way, the second computing system can use the shared encryption key to decrypt the received data. In any case, the application instructs the processor to use the encryption path so that any encrypted data is first decrypted before being delivered.

At block 310, the memory controller determines, using the indicator in the read request, whether to the use the encryption path or the bypass path. If the bypass path is selected, the method 300 proceeds to block 315 where the memory controller retrieves the data from the memory in its current state (which can be encrypted or unencrypted). No decryption is performed.

If the encryption path is selected, the method 300 instead proceeds to block 320 where the encryption engine in the encryption path decrypts data using an encryption key based on the read address. That is, in this embodiment, hardware logic in the memory controller uses the read address (i.e., the physical address or range of addresses the data is stored in memory) to generate an encryption key to decrypt the data. So long as the data is stored at the same memory address as it was stored when being written into memory, the memory controller generates an encryption key that is the same as the one used by the memory controller when encrypting the data when writing the data into the memory. Put differently, so long as the data is retrieved from the same location in the memory that it was written to when being encrypted, the memory controller generates the same encryption key, and thus, can successfully decrypt the data.

Of course, the method 300 can be used with a static encryption key, in which case it would not matter if the data being retrieved is stored in a different location of the memory than it was original stored when being written (and encrypted) into the memory. In that scenario, any data that is encrypted when written into the memory is encrypted using the same key, and thus, the physical addresses of the data when being decrypted does not matter.

At block 325, the processor delivers the data to a destination specified by the user application. For example, the processor may forward the data to a local disk drive for storage or to a network adapter that transfers the data to a remote destination using, e.g., a network.

Figure 4:
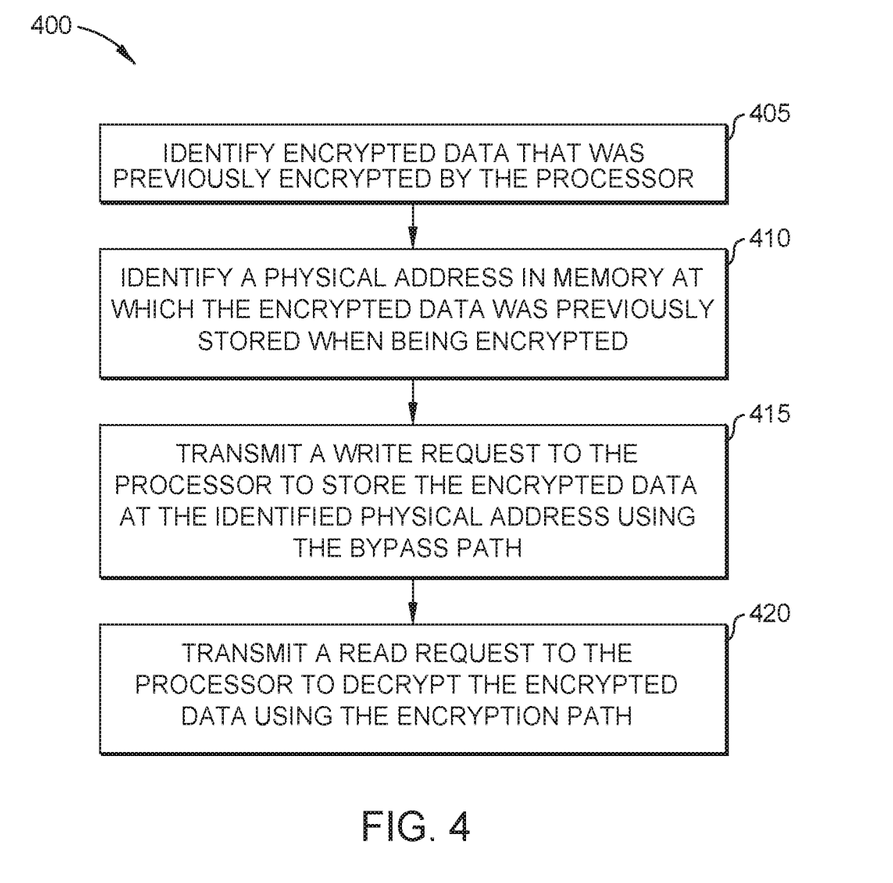
FIG. 4 is a flowchart for decrypting data that was previously encrypted by a processor, according to one embodiment described herein.

FIG. 4 is a flowchart of a method 400 for decrypting data that was previously encrypted by a processor, according to one embodiment described herein. That is, the method 400 assumes that data that was previously encrypted by the processor was removed from the memory and stored somewhere else still in its encrypted state (e.g., a long term storage device). The application now wants to decrypt the encrypted data to, for example, do further processing, or to send the unencrypted data to a different computing device for processing. Because the data was encrypted using the secure encryption key in the processor, the same processor must be used to decrypt the data before it can be processed further.

At block 405, the user application identifies encrypted data that was previously encrypted by the processor. This data may currently be stored somewhere besides the memory (e.g., RAM) in the computing device. In one embodiment, data encrypted using the processor may be flagged or tracked by software or the hypervisor so that the user application can determine which processor in a multi-processor system encrypted the data. That way, the application can identify which processor should be tasked with decrypting the data.

At block 410, the application (or the hypervisor) identifies a physical address in memory at which the encrypted data was previously stored when being encrypted. As mentioned above at block 225, when encrypting data, the processor may provide the physical address at which the encrypted data was stored to the software application. This same physical address may be used as part of the encryption key. Thus, to decrypt the data, the memory controller needs to know the physical address used when encrypting the data. However, in embodiments where the encryption key is not based on the physical address of the memory, this block may be skipped.

The application can use any data structure to track the physical addresses of data encrypted by the processor. For example, for each chunk of encrypted data, the application may add an entry in a table that indicates which processor performed the encryption and the physical address at which the data was stored in memory when being encrypted. However, any technique for tracking this information can be used.

At block 415, the hypervisor transmits a write request to the processor to store the encrypted data at the identified physical address using the bypass path. That is, because the data is already encrypted, the hypervisor can use an indicator informing the memory controller to use the bypass path so the already encrypted data is not re-encrypted when being stored in memory. Further, if the identified physical address is occupied with other data, the memory controller may evict this data, or wait until the other data is removed from the memory. Again, in one embodiment, the encrypted data may be stored in the same memory location used when originally encrypting the data so that the same encryption key is generated when decrypting the data.

At block 420, the hypervisor transmits a read request to the processor to decrypt the encrypted data using the encryption path. In response, the memory controller uses the physical address in the read request (which in this example is the same address used when the data was previously encrypted by the processor) to generate the same encryption key that was used to encrypt the data. The encryption engine in the encryption path uses the encryption key to decrypt the encrypted data. The now unencrypted data can again be stored in memory (where further processing is done on the data at the behest of the user application) or can be transmitted to a different compute element (e.g., a different processor or storage element, or a different computing system).

In this manner, the method 400 illustrates techniques for encrypting data using hardware encryption where the encrypted data can be stored in its encrypted state in a long term storage element. The encrypted data can then be returned to the same processor and decrypted using the encryption key. Doing so may be faster and more secure than using software encryption where an encryption key is made available to software applications.

Figure 5A:
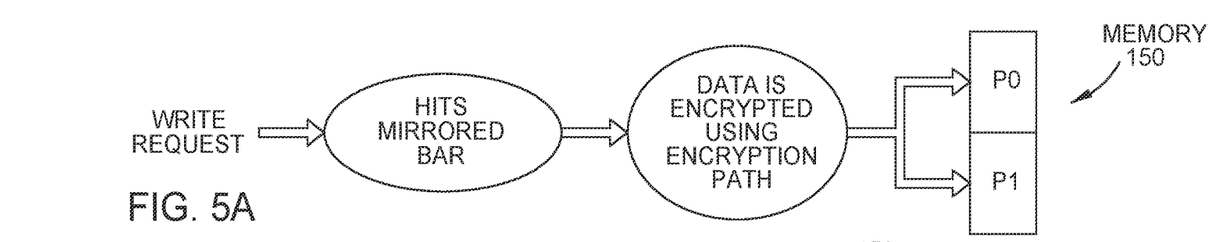
FIG. 5A illustrates performing a write request to encrypt data when mirroring is enabled, according to one embodiment described herein.

FIG. 5A illustrates performing a write request to encrypt data when mirroring is enabled, according to one embodiment described herein. Data mirroring is when the same physical address points to two separate physical memory elements. Mirroring may be used to provide data redundancy so that if one copy of the data is corrupted, the data can be retrieved from the other physical memory element. In this example, the memory 150 includes at least two separate memory elements or blocks (P0 and P1).

In FIG. 5A, the processor receives a write request that hits a mirrored BAR. In this example, the mirrored BAR is an indicator that the data being written into the memory 150 should be encrypted using the encryption path. In one embodiment, the mirrored BAR is different from the physical address at which the encrypted data is written into the memory 150.

The data is then encrypted by the encryption engine in the encryption path. Duplicates of the encrypted data are stored in both memory elements P0 and P1.

Figure 5B:
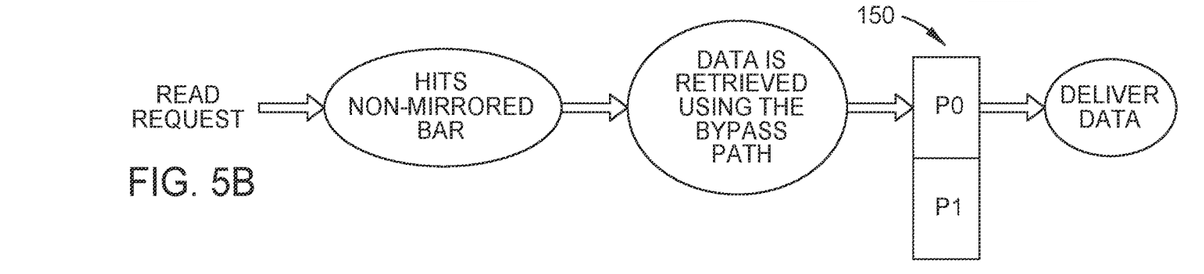
FIG. 5B illustrates performing a read request to retrieve the encrypted data using a bypass path when mirroring is enabled, according to one embodiment described herein.

FIG. 5B illustrates performing a read request to retrieve the encrypted data using a bypass path when mirroring is enabled, according to one embodiment described herein. In this example, the read request hits a non-mirrored BAR which is an indicator that the data is to be retrieved from the memory 150 as part of the read request should not be decrypted. As such, the memory controller uses the bypass path to retrieve the data from the memory 150.

Moreover, because each of the memory elements P0 and P1 contain duplicative (i.e., the same) encrypted data, the memory controller can retrieve the data from either element. In this example, the data is retrieved from the memory element P0. Once retrieved, the processor delivers the data to whatever destination indicated by the application generating the read request.

Figure 6A:
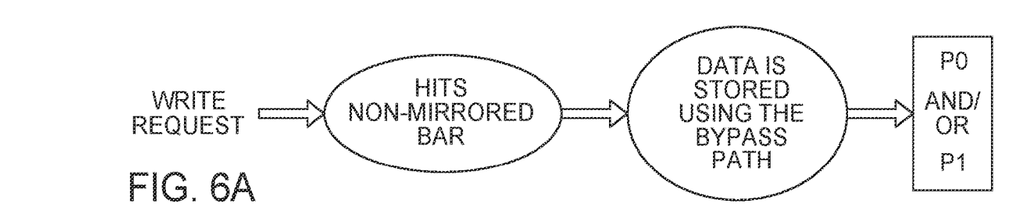
FIG. 6A illustrates performing a write request to store encrypted data using a bypass path when mirroring is enabled, according to one embodiment described herein.

FIG. 6A illustrates performing a write request to store encrypted data using a bypass path when mirroring is enabled, according to one embodiment described herein. Like in the method 400 in FIG. 4, it is assumed that the data corresponding to the write request has already been encrypted by the processor and was then moved from the memory 150 into a different storage element. That is, the data in the write request in FIG. 6A may be the same data that was encrypted by the write request in FIG. 5A, and then removed from the memory in its encrypted state by the read request in FIG. 5B.

To decrypt the encrypted data, the write request hits the non-mirrored BAR. As a result, the memory controller uses the bypass path to store the encrypted data in the memory. Also, assuming the encryption key used in FIG. 5A is based on the physical address corresponding to P0 and P1, the write request may stipulate that memory controller stores the encrypted data in either P0 or P1. If data mirroring is still activated, the memory controller may store the encrypted data in both P0 and P1; however, it may be sufficient to store the data at only one of these memory elements.

Figure 6B:
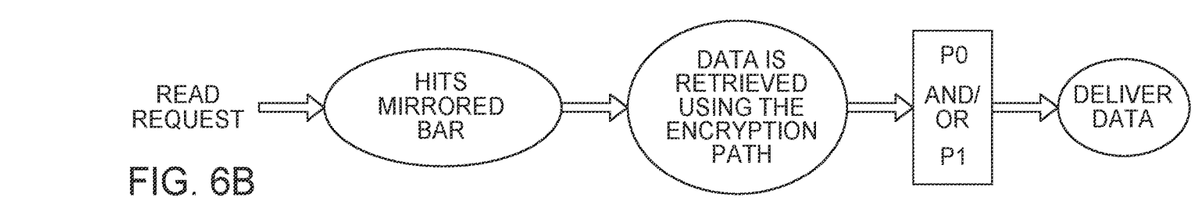
FIG. 6B illustrates performing a read request to decrypt the encrypted data using an encryption path when mirroring is enabled, according to one embodiment described herein.

FIG. 6B illustrates performing a read request to decrypt the encrypted data using an encryption path when mirroring is enabled, according to one embodiment described herein. After storing the encrypted data as shown in FIG. 6A, the processor receives a read request for the data stored in P0 or P1 (or both). This read request hits the mirrored BAR thereby indicating to the memory controller that the data should be retrieved using the encryption path. In response, the memory controller generates the same encryption key used when encrypting the data in FIG. 5A and decrypts the data. The unencrypted data is then delivered to the destination indicated by the application generating the read request. In this manner, the encryption/bypass paths and the dynamic hardware encryption keys discussed above can be used in a computer system that has memory mirroring enabled.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor core; and
   a memory controller comprising an encryption path and a bypass path, wherein the encryption path comprises an encryption engine for encrypting and decrypting data, wherein the bypass path bypasses the encryption engine, and wherein the memory controller is configured to:
   receive a first write request to write first data into a memory, the first write request comprising a first indicator indicating that the encryption path should be used;
   encrypt the first data using the encryption engine before storing the first data in the memory, wherein the encryption engine uses an encryption key comprising a static portion and a dynamic portion, and wherein the dynamic portion is generated based on a current physical address of the first data;
   receive a first read request to read the first data from the memory, the first read request comprising a second indicator indicating that the bypass path should be used;
   retrieve the first data from the memory using the bypass path, wherein the first data remains encrypted;
   receive a second write request to write the first data to the memory, the second write request comprising the second indicator indicating that the bypass path should be used, wherein the first data remains encrypted;
   store the first data in the memory using the bypass path;
   receive a second read request to read the first data from the memory, the first read request comprising the first indicator indicating that the encryption path should be used; and
   decrypt the first data using the encryption engine in the encryption path, wherein the encryption engine uses a decryption key comprising a static portion and a dynamic portion, and wherein the dynamic portion is generated based on the current physical address of the first data.

2. The system of claim 1, wherein, when performing the first and second write requests, the first data is written into the memory using a same physical address as specified in the first and second write requests.

3. The system of claim 1, wherein the static portion is an ID assigned to the processor core or the memory controller during manufacturing.

4. The system of claim 1, wherein the static portion is stored in the processor core or the memory controller, and wherein the static portion is unreadable by any entity external to the processor core or the memory controller.

5. A method, comprising:
receiving a first write request at a memory controller to write first data into a memory, the first write request comprising a first indicator indicating that an encryption path in the memory controller should be used;
encrypting the first data using an encryption engine in the encryption path before storing the first data in the memory, wherein the encryption engine uses an encryption key comprising a static portion and a dynamic portion, and wherein the dynamic portion is generated based on a current physical address of the first data;
receiving a first read request at the memory controller to read the first data from the memory, the first read request comprising a second indicator indicating that a bypass path should be used, wherein the bypass path bypasses the encryption engine;
retrieving the first data from the memory using the bypass path, wherein the first data remains encrypted;
receiving a second write request at the memory controller to write the first data to the memory, the second write request comprising the second indicator indicating that the bypass path should be used, wherein the first data remains encrypted;
storing the first data in the memory using the bypass path;
receiving a second read request at the memory controller to read the first data from the memory, the second read request comprising the first indicator indicating that the encryption path should be used; and
decrypting the first data using the encryption engine in the encryption path, wherein the encryption engine uses a decryption key comprising a static portion and a dynamic portion, and wherein the dynamic portion is generated based on the current physical address of the first data.

6. The method of claim 5, wherein, when performing the first and second write requests, the first data is written into the memory using a same physical address as specified in the first and second write requests.

7. A memory controller in an integrated circuit, comprising:
an encryption path comprising an encryption engine; and
a bypass path configured to bypass the encryption engine, wherein the memory controller is configured to:
receive a first write request to write first data into a memory, the first write request comprising a first indicator indicating that the encryption path should be used;
encrypt the first data using the encryption engine before storing the first data in the memory, wherein the encryption engine uses an encryption key comprising a static portion and a dynamic portion, and wherein the dynamic portion is generated based on a current physical address of the first data;
receive a first read request to read the first data from the memory, the first read request comprising a second indicator indicating that the bypass path should be used;
retrieve the first data from the memory using the bypass path, wherein the first data remains encrypted;
receive a second write request to write the first data to the memory, the second write request comprising the second indicator indicating that the bypass path should be used, wherein the first data remains encrypted;
store the first data in the memory using the bypass path;
receive a second read request to read the first data from the memory, the first read request comprising the first indicator indicating that the encryption path should be used; and
decrypt the first data using the encryption engine in the encryption path, wherein the encryption engine uses a decryption key comprising a static portion and a dynamic portion, and wherein the dynamic portion is generated based on the current physical address of the first data.

8. The memory controller of claim 7, wherein, when performing the first and second write requests, the first data is written into the memory using a same physical address as specified in the first and second write requests.

9. The memory controller of claim 7, wherein the first indicator and the second indicator correspond to different base address registers (BARs).

* * * * *